United States Patent [19]

Noda et al.

[11] Patent Number: 5,123,003
[45] Date of Patent: Jun. 16, 1992

[54] OPTICAL INFORMATION REPRODUCING APPARATUS

[75] Inventors: Kazuo Noda, Yokohama; Koichi Yamazaki, Sakado, both of Japan

[73] Assignee: Nippon Conlux Co., Ltd., Tokyo, Japan

[21] Appl. No.: 273,426

[22] Filed: Nov. 18, 1988

[30] Foreign Application Priority Data

Nov. 20, 1987 [JP] Japan .................. 62-293849

[51] Int. Cl.$^5$ .............................................. G11B 7/00
[52] U.S. Cl. ............................. 369/44.37; 369/44.41; 369/109; 369/124; 250/201.5
[58] Field of Search ............... 369/44, 45, 118, 120, 369/46, 119, 111, 112, 109, 124, 275.1, 44.37–44.42; 250/201.5, 578; 235/454

[56] References Cited

U.S. PATENT DOCUMENTS

| | | | |
|---|---|---|---|
| 4,532,522 | 7/1985 | Tsunoda et al. | 369/44.38 |
| 4,546,460 | 10/1985 | Ando | 369/46 |
| 4,787,075 | 9/1988 | Matsuoka | 369/46 |
| 4,860,275 | 8/1989 | Kakinuma et al. | 369/109 |
| 4,864,113 | 9/1989 | Ogura | 369/124 |
| 4,872,154 | 10/1989 | Sakagami et al. | 369/275.1 |
| 4,935,913 | 6/1990 | Shinoda | 369/109 |

Primary Examiner—Roy N. Envall, Jr.
Assistant Examiner—Thang V. Tran
Attorney, Agent, or Firm—Koda and Androlia

[57] ABSTRACT

The present invention relates to the improvement in an apparatus for reproducing information from a card-like optical information recording medium including tracks for guiding and tracks for information. At least three light spots are formed in said card-like recording medium by light-spot forming means. Signal detection means then detects focusing control signals and tracking control signals by scanning said tracks for guiding with a spot among said light spots. Further, signal reproducing means reproduces information signals of plural tracks by scanning the information tracks with the remaining at least two light spots. The reproduced information signals of the plural tracks are stored in plural memories separately for each track. Subsequently, read-out means sequentially and successively reads the stored information by the time sharing system from each of the plural memories with a speed larger than that when said reproduced information has been input.

8 Claims, 5 Drawing Sheets

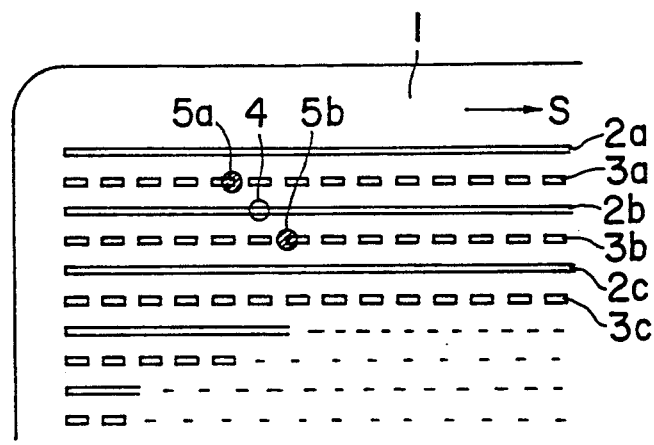
F I G. 1
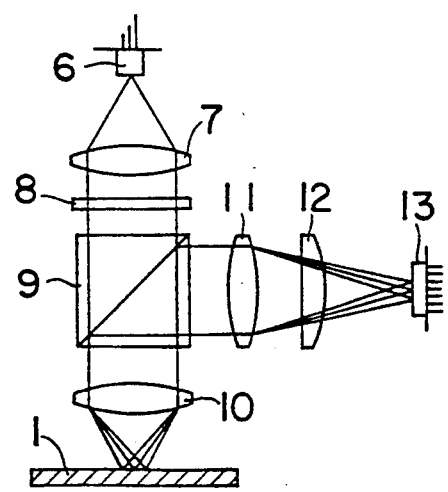
F I G. 2

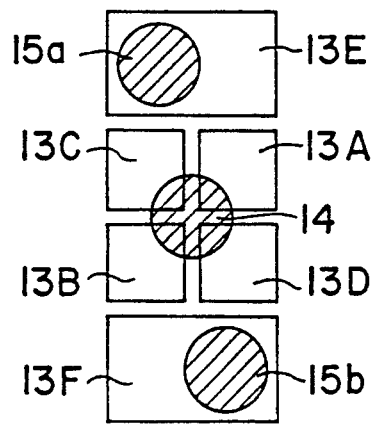
F I G. 3
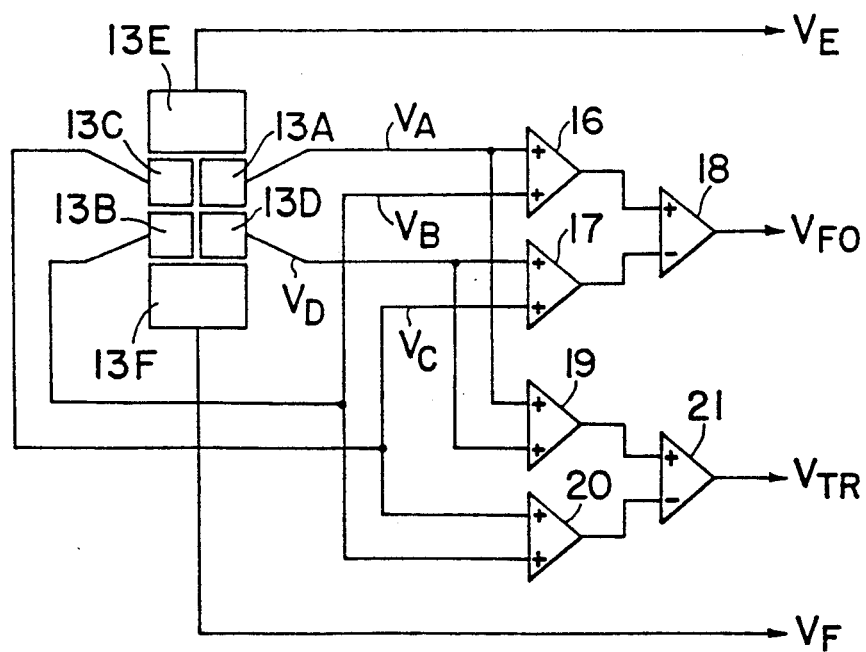
F I G. 4

OPTICAL INFORMATION REPRODUCING APPARATUS

BACKGROUND OF THE INVENTION

1. Field of the Art

This invention relates to an apparatus for optically reproducing information, and more particularly relates to an apparatus used for card-like optical information recording media.

2. Prior Art

Heretofore, in the card-like optical information recording medium (termed the optical card hereinafter), tracks for guiding and tracks for information are alternately disposed on a card surface. The tracks for information are scanned utilizing the tracks for guiding, and information is taken out.

However, when tracks for guiding and tracks for information are alternately disposed as described above, the recording density of the area which can be utilized for information recording within the card surface does not exceed a certain extent.

As a result, in order to increase the amount of information reproduction per unit time, the speed of the optical head or optical cards (or the shuttle for carrying the cards) should be increased.

All of these countermeasures require, however, mechanical solutions, and hence the problems are complicated.

SUMMARY OF THE INVENTION

The present invention has been done for solving the above-described problems. It is an object of the present invention to provide an optical information reproducing apparatus in which the read-out speed of information is increased without changing the speed of the reciprocating movement of the optical head side or the shuttle side.

The present invention provides an apparatus for reproducing information from a card-like optical information recording medium having tracks for guiding and tracks for information. The optical information reproducing apparatus according to the present invention comprises means for forming plural, for example three or five, light spots on said medium, means for detecting focusing control signals and tracking control signals by scanning the tracks for guiding with a light spot among the plural spots, and means for reproducing information signals in plural tracks by scanning the information tracks with the remaining plural (for example two or four) light spots, and inputs the reproduced information signals in these plural tracks in plural memories (for example two or four semiconductor memories), and then sequentially and continuously reads out information from these plural memories with a speed higher (for example twice or four times) than the reproduced information signals which have been input in the memories, and thus the read-out speed of information is increased.

BRIEF DESCRIPTION OF THE DRAWINGS

FIG. 1 is a schematic plan view showing the relationship between the optical card and three light spots when information is reproduced by an apparatus of the present invention;

FIG. 2 is a schematic diagram showing a configurational example of an optical head used in an apparatus of the present invention;

FIG. 3 is a diagram showing a configurational example of a photodiode element and three reflected-light spots;

FIG. 4 is a block diagram showing a configurational example of a circuit which takes out focusing control signals, tracking control signals and two reproduced information signals from the photodiode in FIG. 3;

DESCRIPTION OF THE PREFERRED EMBODIMENTS

Figure 5:
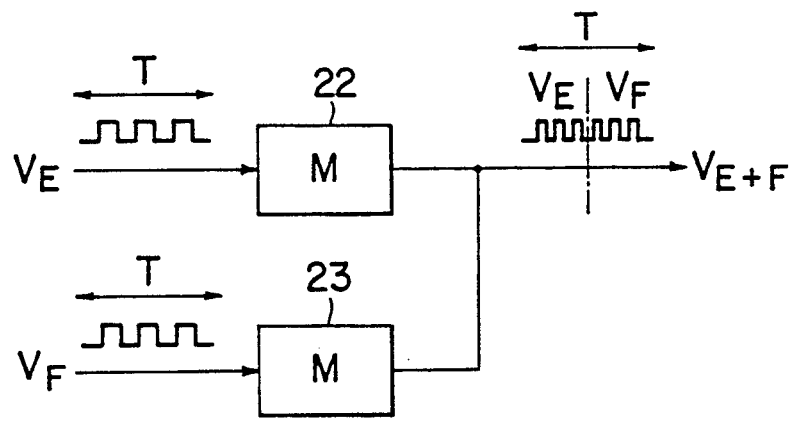
FIG. 5 is a schematic diagram showing a configurational example of a circuit which doubles the reproducing speed of information.

FIG. 1 shows the relationship between the optical card and light spots when information is reproduced by an apparatus of the present invention. In FIG. 1, tracks 2 (2a, 2b, 2c, ... ) for guiding and information tracks 3 (3a, 3b, 3c, ... ) are formed in an optical card 1. On the optical card 1, light spots 4, 5a and 5b are projected on the track 2b for guiding, the information tracks 3a and 3b, respectively, by an optical head. The light spot 4 is for obtaining control signals for focusing and tracking. Both the focusing control signals and tracking control signals are taken out by well-known methods: for example, the astigmatism method for the focusing control signals, and the push-pull method for the tracking control signals. The light spots 5a and 5b are for obtaining information signals. For example, by moving the optical card 1 from right to left, the light spots 5a and 5b relatively scan in the direction of the arrow S, and information signals on the information tracks 3a and 3b are reproduced from the light spots 5a and 5b, respectively.

FIG. 2 shows a configurational example of an optical head for reproducing focusing control signals and tracking control signals and two information signals by irradiating the light spots 4, 5a and 5b on the optical card 1.

The optical head shown in FIG. 2 comprises a semiconductor laser 6, a collimating lens 7, a diffraction grating 8, a half-prism (or a half-mirror) 9, a focusing lens 10, a light-receiving lens 11, a cylindrical lens 12 and a photodiode 13.

In FIG. 2, divergent laser light emitted from the semiconductor laser 6 is converted into parallel light by the collimating lens 7, and then forms three beams consisting of the 0-order diffraction light and the ±1st-order diffraction lights. The three beams are transmitted through the half-prism 9, and are focused by the focusing lens 10 which moves in the direction vertical to the surface of the optical card 1 and in the direction perpendicular to the tracks 2 for guiding in the optical card 1, and become the light spots 4, 5a and 5b. The light spot 4 is projected on the track 2b for guiding in the optical card 1. Here, when a part of the laser light is reflected, focusing information and tracking information are given. The light spots 5a and 5b are projected on the information tracks 3a and 3b in the optical card 1, respectively. Here, the information recorded on the information tracks 3a and 3b is given to the reflected laser lights. The three laser lights reflected from the optical card 1 move back through the focusing lens, are reflected at the half-prism 9 toward right, and are focused by the light-receiving lens 11. Then, astigmatism is given at the cylindrical lens 12, and the laser lights reach the photodiode 13. Here, the optical information which the reflected laser lights have is converted into electric information signals.

FIG. 3 shows a configurational example of the photodiode 13. Four elements, 13A, 13B, 13C and 13D are disposed in the form closely aligned in two rows and two columns, and elements 13E and 13F are disposed on both sides thereof. The three laser lights reflected from the optical card 1 pass through the light-receiving lens 11 and the cylindrical lens 12, and then are projected on each element of the photodiode 13 as reflected-light spots 14, 15a and 15b as shown in FIG. 3.

Electric outputs $V_A$, $V_B$, $V_C$, $V_D$, $V_E$ and $V_F$ are obtained from the elements 13A, 13B, 13C, 13D, 13E and 13F of the photodiode 13, respectively, as shown in FIG. 4. $V_{FO}=(V_A+V_B)-(V_C+V_D)$, $V_{TR}=(V_A+V_D)-(V_B+V_C)$ are obtained by adders 16, 17, 19 and 20, and subtracters 18 and 21. The $V_{FO}$ and $V_{TR}$ are made as the focusing control signal and the tracking control signal, respectively, as well known to the public.

The electric signals $V_E$ and $V_F$ from the elements 13E and 13F are reproduced information signals from the information tracks 3a and 3b, respectively. In the present invention, the reproducing speed of information is increased by performing signal processing of these two reproduced information signals $V_E$ and $V_F$. That is, as shown in FIG. 5, the reproduced information signals $V_E$ (for time T) and $V_F$ (for time T) are input in memories 22 and 23, respectively. From the memories 22 and 23, information is successively read out, first from the memory 22, and then from the memory 23 with a clock frequency twice the clock frequency contained in the reproduced information signals $V_E$ and $V_F$ to produce an information signal $V_{E+F}$ (for time T). Thus, the reproducing speed of information is doubled compared with the reproducing speed from a single information track.

Figure 6:
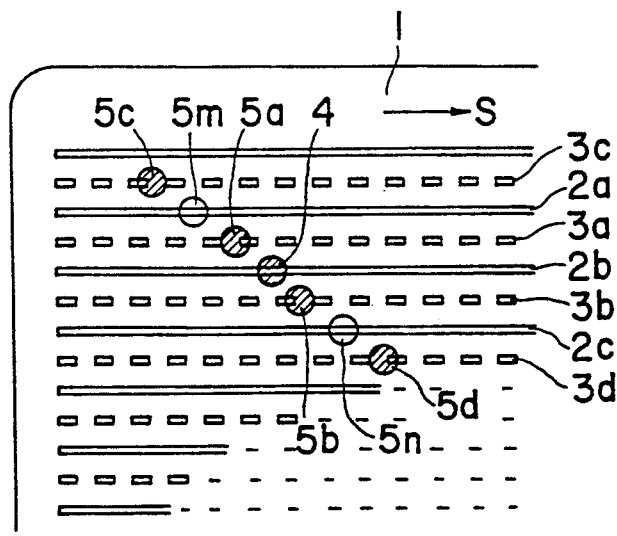
FIG. 6 is a schematic plan view showing the relationship between the optical card and five light spots when information is reproduced by an apparatus of the present invention.

FIG. 6 shows the relationship between the optical card and light spots when information signals are reproduced from four information tracks 3a, 3b, 3c and 3d, and thus the reproducing speed of information is increased by four times compared with the reproducing speed of a single information track. In this case, five light beams, i.e., the 0-order diffraction light, the ±1st-order diffraction lights and the ±3rd-order diffraction lights, are formed by the diffraction grating 8 in the optical head shown in FIG. 2. These five beams are focused by the focusing lens 10 which moves in the direction vertical to the surface of the optical card 1 and in the direction perpendicular to the tracks 2 for guiding in the optical card 1, and become light spots 4, 5a, 5b, 5c and 5d. Actually, in this case, light spots 5m and 5n due to the ±2nd-order diffraction lights are also produced, but since these have no particular relation with the present invention, the explanation thereof will be omitted.

The light spot 4 is projected on the track 2b for guiding in the optical card 1. Here, focusing information and tracking information are given to the reflected laser light. The light spots 5a, 5b, 5c and 5d are projected on the information tracks 3a, 3b, 3c and 3d in the optical card 1. Here, information recorded in the information tracks 3a, 3b, 3c and 3d is given to the reflected laser lights. The five laser lights reflected from the optical card 1 reach the photodiode 13, where the optical information which the reflected laser lights have is converted into electric information signals.

Figure 7:
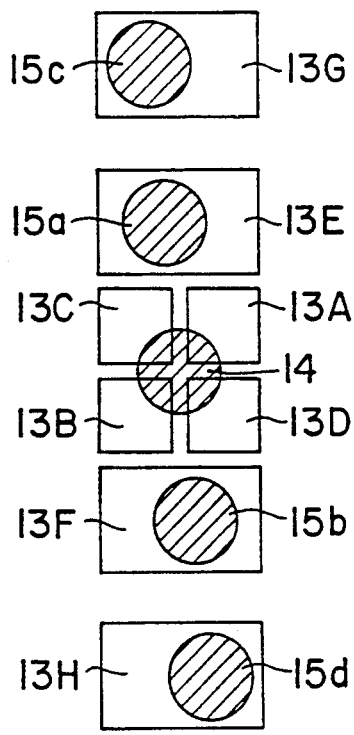
FIG. 7 is a diagram showing a configurational example of a photodiode element and five reflected-light spots.

FIG. 7 shows a configurational example of the photodiode 13 in the case of five beams. Elements 13G and 13H are disposed at both sides of the photodiode shown in FIG. 3. The five laser lights reflected from the optical card 1 become reflected-light spots 14, 15a, 15b, 15c and 15d as shown in FIG. 7, and are projected on each element of the photodiode.

Figure 8:
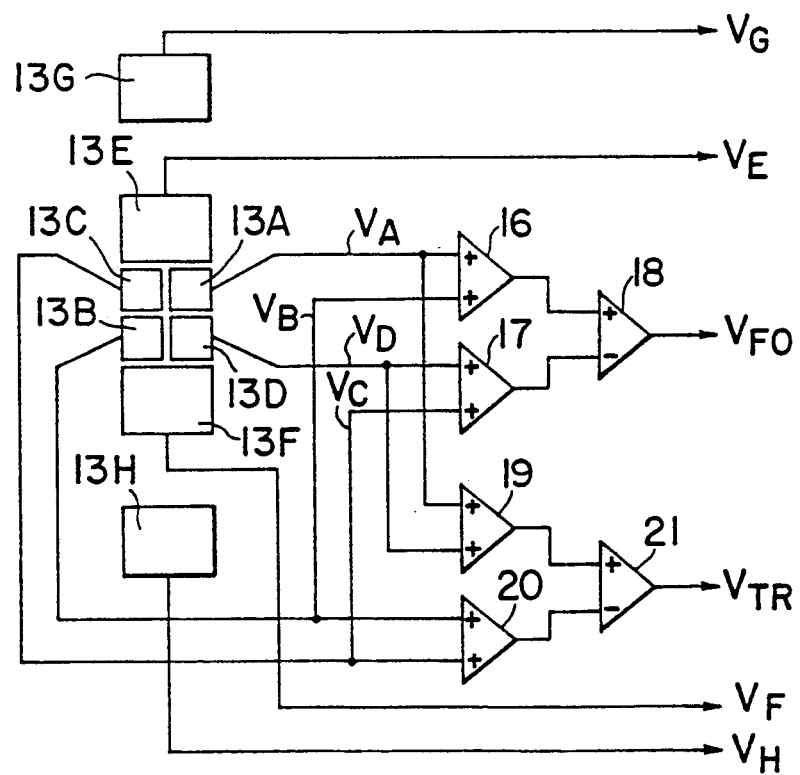
FIG. 8 is a block diagram showing a configurational example of a circuit which takes out focusing control signals, tracking control signals and four reproduced information signals from the photodiode in FIG. 7.
Figure 9:
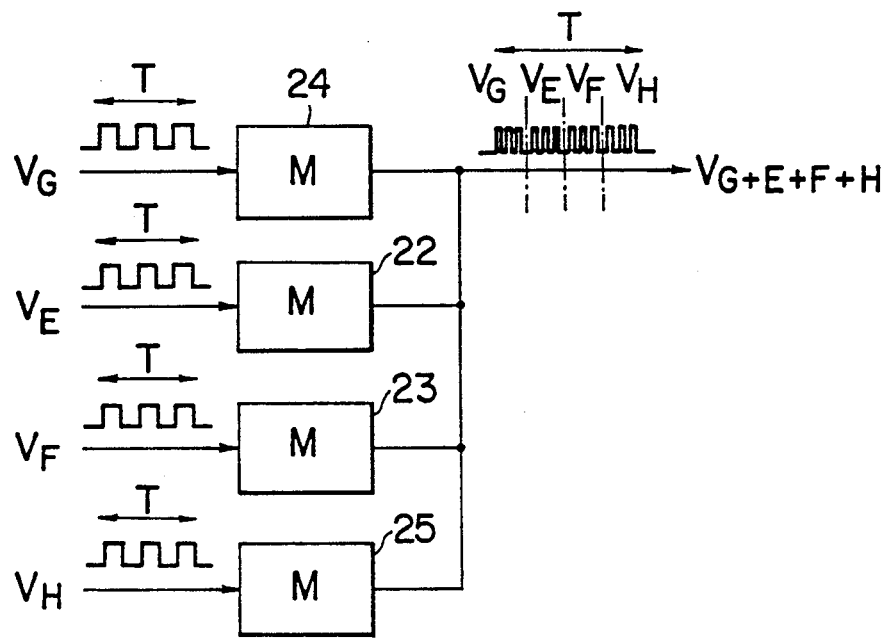
FIG. 9 is a schematic diagram showing a configurational example of a circuit which increases the reproducing speed of information by four times.

From the photodiode 13, as shown in FIG. 8, the focusing control signal $V_{FO}$ and the tracking control signal $V_{TR}$ are taken out like in FIG. 4. electric information signals $V_E$, $V_F$, $V_G$ and $V_H$ are also taken out from the elements 13E, 13F, 13G and 13H. The electric information signals $V_E$, $V_F$, $V_G$ and $V_H$ are reproduced information from the information tracks 3a, 3b, 3c and 3d, respectively. In the present invention, the reproducing speed of information is increased by performing the signal processing of these four reproduced information signals $V_E$, $V_F$, $V_G$ and $V_H$. That is, as shown in FIG. 9, the reproduced information signals $V_E$ (for time T), $V_F$ (for time T), $V_G$ (for time T) and $V_H$ (for time T) are input in memories 22, 23, 24 and 25, respectively. From the memories 22, 23, 24 and 25, information is sequentially and successively read out, first from the memory 24, then from the memories 22, 23 and 25 with a clock frequency four times the clock frequency contained in the reproduced information signals $V_E$, $V_F$, $V_G$ and $V_H$ to produce an information signal $V_{G+E+F+H}$ (for time T). Thus, the reproducing speed of information is increased by four times compared with the reproducing speed from a single information track.

When it is desired to further increase the reproducing speed of information, the odd and higher-order, such as the ±5th-order, the ±7th-order and the like, diffraction lights of the diffraction grating 8 may also be utilized, as can easily be analogized from the above-described explanation.

Figure 10:
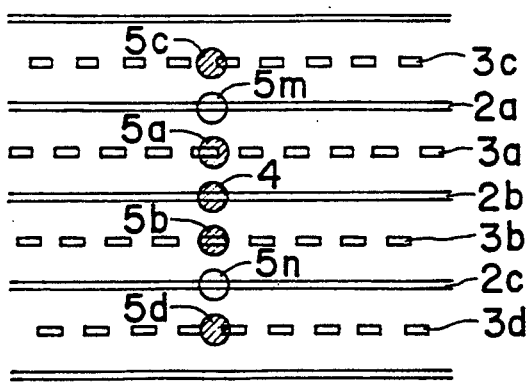
FIG. 10 is a diagram when the five light spots shown in FIG. 6 are arranged in the direction perpendicular to information tracks.

In the above-described explanation of the present invention, it is assumed that the light spots 5 projected on the optical card 1 are arranged in a direction oblique to the tracks 2 for guiding and the information tracks 3, as shown in FIGS. 1 and 6. The light spots 5 may be arranged, however, in the direction perpendicular to the tracks 2 for guiding and the information tracks 3 as shown in FIG. 10, unless inconvenience does not exist such that adjacent light spots partially overlap one another. Further, in the present invention, the even-order, such as the ±2nd-order, the ±4th-order and the like, diffraction lights of the diffraction grating 8 are unnecessary. Hence, it is desirable to take care in designing the diffraction grating 8 so that the intensities of these even-order diffraction lights become as small as possible.

In the optical information reproducing apparatus of the present invention, when reciprocating scanning is performed with projecting the light spots 5 on the optical card 1, information is input in memories at the forward movement, and the information is reproduced with performing the operations such that the information stored at the forward movement is output with a reproducing speed, such as twice, four times and the like, at the backward movement, and at the same time the information at the backward movement is input in memories. When information is recorded in the optical card 1, recording is usually performed by reciprocating a single light spot. Hence, when information is reproduced using plural spots as in the present invention, the time series of the reproduced information is reversed at every information track. Whether the reproduction in question is at the forward movement or at the backward movement can easily be detected by address signals recorded in an edge of the information track. Accordingly, correction may be performed when the information is output from the memory.

In the above-described explanation of the present invention, the optical card has been exemplified. However, it goes without saying that the optical information reproducing apparatus of the present invention is applicable not only to the optical card, but also to the optical disk or the like.

As described above, according to the optical information reproducing apparatus of the present invention, it is possible to increase the speed of information read-out from the optical card without changing the scanning speed of the light spots which are projected on and scan the optical card. Hence, the present invention has effects such that the performance of the information reproducing apparatus can be improved, and the miniaturization and economization of the apparatus become also possible.

What is claimed is:

1. An optical information reproducing system comprising:

information recording medium having guiding tracks and information tracks, both of the tracks being provided on the surface of said medium, and at least two information tracks being provided with the respective guiding tracks;

light-spot forming means for forming at least three light spots on the information recording medium which is positioned at a predetermined position relative to said light-spot forming means, said light-spot forming means having a diffraction rating to separate said light spots into zero-order, first-order and third-order diffraction lights;

light spot receiving means for giving said zero-order, first-order and third order diffraction light reflected by said information recording medium an astigmatism;

first photo-electric conversion means for converting the reflected zero-order diffraction light from said light spot receiving means to an electrical signal which is used for focussing and tracking the guiding tracks;

second photo-electric conversion means for converting the reflected first-order and third-order diffraction lights from said light spot receiving means to reproduce at least two information concurrently; and a plurality of storage means for storing reproduced information signals of the plural tracks separately for each track and for sequentially successively reading out the stored information from each of the plurality of storage means.

2. An optical information reproducing apparatus according to claim 1, wherein the number of said light spots is three.

3. An optical information reproducing apparatus according to claim 1, wherein the number of said light spots is five.

4. An optical information reproducing apparatus according to claim 1, wherein said optical signal detection means is configured such that an element disposed at the center scans said tracks for guiding, and other elements disposed at both sides of said element disposed at the center scan said tracks for information.

5. An information reproducing apparatus according to claim 4, wherein said optical signal detection means is configured such that a combination element consisting of four square elements closely arranged in two rows and two columns is disposed at the center, and focus error signals are formed by signals from two pairs of elements in the diagonal directions in the combination element.

6. An information reproducing apparatus according to claim 5, wherein said optical signal detection means is configured such that tracking error signals are formed by signals from two pairs of elements, each pair being on the identical side.

7. An optical information reproducing system according to claim 1 wherein said information recording medium is provided with four information tracks and said light spot forming means forms five spots which are projected on at least one guiding track and said for information tracks.

8. An optical information reproducing system according to claim 7 wherein said second photo electric conversion means reproduces four information signals concurrently.

* * * * *